(12) United States Patent
Tanada

(10) Patent No.: US 6,199,992 B1
(45) Date of Patent: *Mar. 13, 2001

(54) REFLECTOR, METHOD OF MANUFACTURING THE SAME, AND DISPLAY DEVICE USING THE REFLECTOR

(75) Inventor: Tetsushi Tanada, Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,241

(22) Filed: Mar. 12, 1998

(30) Foreign Application Priority Data

Mar. 13, 1997 (JP) ...................................................... 9-059145
Mar. 13, 1997 (JP) ...................................................... 9-059153
Jun. 12, 1997 (JP) ...................................................... 9-155339

(51) Int. Cl.$^7$ ................................ G02B 5/10; F21V 7/00; G02F 1/1335
(52) U.S. Cl. ............................ 359/858; 362/347; 349/67
(58) Field of Search .................................... 359/838, 839, 359/850, 851, 853, 858, 859, 867, 868, 869; 362/297, 298, 516, 518, 241, 341, 342, 347, 348, 350; 349/67, 113

(56) References Cited

U.S. PATENT DOCUMENTS

| 4,732,441 | * | 3/1988 | Cheng ................................. 359/850 |
| 5,577,833 | * | 11/1996 | English et al. ....................... 362/297 |
| 5,841,496 | * | 11/1998 | Itoh et al. ............................ 349/113 |
| 5,851,740 | * | 12/1998 | Sawyer ............................... 359/226 |

* cited by examiner

Primary Examiner—Cassandra Spyrou
Assistant Examiner—Jared Treas
(74) Attorney, Agent, or Firm—Brinks Hofer Gilson & Lione

(57) ABSTRACT

A reflector includes a reflecting surface provided on a display cell, and fine concave surfaces are formed on the surface of the reflector. When the cross sections of the concave surfaces are formed in the shape of circular curves, the frequency of tilt angles $\theta 1, \theta 2, \ldots \theta n$ formed between tangents to the concave surfaces and horizontal lines H can be set to predetermined angle range $\theta 1$ to $\theta n$, an angle range in which luminance of reflected light increases can be determined, and the reflected light can be allowed to have a directivity within the angle range. By designing $\theta 1$ and $\theta n$ in accordance with an effective viewing angle of the display cell, display contrast can be increased.

12 Claims, 11 Drawing Sheets

FIG. 6A
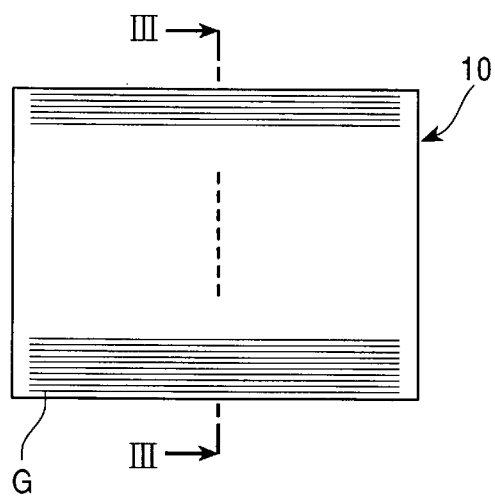
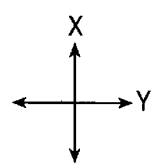
FIG. 6B
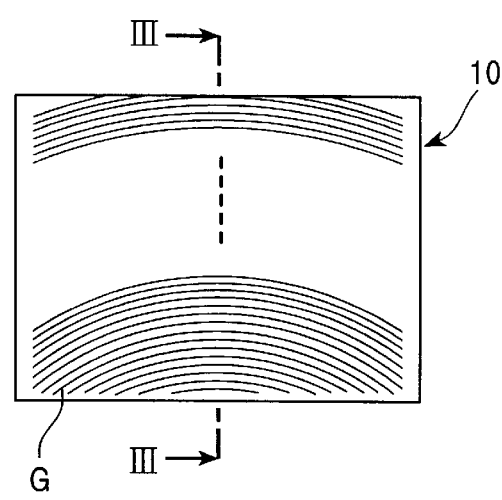
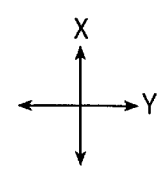

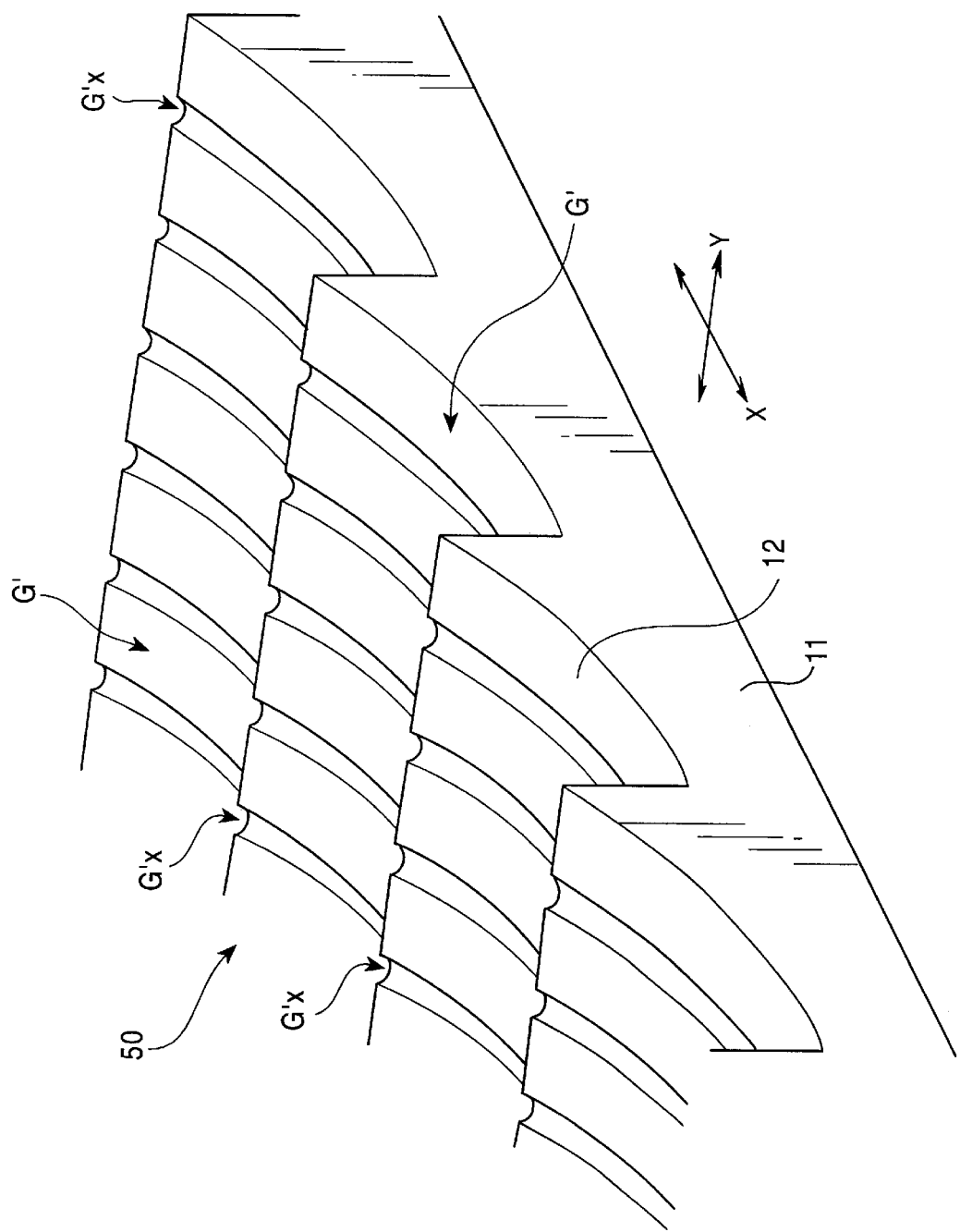

REFLECTOR, METHOD OF MANUFACTURING THE SAME, AND DISPLAY DEVICE USING THE REFLECTOR

BACKGROUND OF THE INVENTION

1. Field of the Invention

The present invention relates to a reflector, to a method of manufacturing the same, and to a display device using the reflector. More particularly, the present invention relates to a reflector having excellent directivity of reflected light which can provide increased intensity of the reflected light in a display device, such as a liquid crystal display device and so forth, and to a display device using the reflector.

2. Description of the Related Art

Display devices, such as liquid crystal display devices, include reflective display devices in which a reflecting surface is provided on the back of a display cell, semi-reflective display devices in which a semi-transmissive reflecting surface is provided on the back of the display cell and a backlight is further provided on the back thereof, and backlight-type display devices in which a backlight is provided behind the display cell. The above backlight is composed of a light guide element, a reflecting surface formed on the back of the light guide element, and a light source for providing light into the light guide element.

Hitherto, a flat mirror surface including a metal film, such as aluminum, deposited thereon, or a rough surface having the metal film deposited thereon has been employed as the reflecting surface.

When the reflecting surface is a flat mirror surface, light cannot be scattered at the reflecting surface, so that it is difficult to impart a sufficient display luminance to the display cell.

When the reflecting surface is a rough surface having the metal film deposited thereon, light can be scattered at the reflecting surface. However, the light scatters at the rough surface in random directions, while the effective viewing angle of a display cell, such as a liquid crystal cell, is limited to a fixed angle, so that the luminance of the reflected light cannot be effectively increased within the range of the effective viewing angle.

In order to allow the reflected light to have a directivity within the angle range in which the luminance of the reflected light increases, it is necessary to optically design the reflecting surface. In addition, it is necessary to form optically designed fine irregularities on the optical reflecting surface. In the conventional reflecting surface, however, it is difficult to form an optical surface having fine irregularities with high accuracy, and to manufacture the optical surface in large quantities.

SUMMARY OF THE INVENTION

Accordingly, it is an object of the present invention to provide a reflector which opically sets the shape of a reflecting surface so that the luminance of reflected light within a predetermined reflection angle can be increased, and which can set the angle range in which the luminance of the reflected light can be increased in relation to an effective viewing angle of a display cell, and to provide a display device using the reflector.

It is another object of the present invention to provide a method of manufacturing a reflector which can optically set the shape of the reflecting surface with fine irregularities, and which can form the irregularities by a simple process with high accuracy.

According to the present invention, the shape of the reflecting surface can be optically designed, and the reflecting surface can be easily manufactured by a process similar to that of manufacturing a hologram or the like.

That is, according to an aspect of the present invention, there is provided a reflector having a total-reflective or a semi-reflective reflecting surface, wherein the reflecting surface has a shape such that fine concave curves are arranged when viewed in cross section. The pitch of the concave curves is, for example, 50 $\mu$m or less.

By optically designing the shape of the fine concave curves, the luminance of reflected light can be increased within a predetermined angle range around a perpendicular line of the reflecting surface.

In addition, when a successive predetermined number of concave curves are taken as one set, it is preferable that different pitches of the concave curves are included in one set, and several units of concave curves are repeatedly formed, one set of concave curves being one unit. In this case, the width of one set of concave curves may be preferably 120 $\mu$m or less.

Thus, by changing the pitch of the concave curve regularly or at random within the range of 120 $\mu$m or more, for example, and by repeatedly form several sets of concave curves, the concave curves having the above width being one set, the light interference fringe phenomenon which presents fringe patterns or rainbow patterns due to the influence of the reflected light can be prevented.

The above concave surfaces being concave curves in cross section may be preferably formed in the shape of stripes, and the stripes of the concave surfaces may preferably extend in the shape of curves when the reflecting surface is viewed as a plane.

With such a construction, not only a directivity of the reflected light within the range in which the luminance of the reflected light increases can be optically set in a direction along the cross section perpendicular to the stripes (the X direction of FIGS. 6A and 6B), but also a distribution of the luminance in a direction perpendicular to the cross section (Y direction) can be set within a predetermined angle range around a perpendicular line of the reflecting surface, so that the range in which the luminance of the reflected light increases can be expanded.

In addition, the stripes may be preferably formed concentrically, for example, as shown in FIG. 6B. In addition, according to the present invention, a number of three-dimensional concave surfaces, such as spherical concave surfaces may be formed adjacent to each other.

The reflecting surface when viewed in cross section may have any one of the following shapes.

When a line perpendicular to tangents to the lowermost portions of the concave curves is taken as a center line O1, the concave curves are circular curves extending symmetrically about the center line O1.

When a line perpendicular to tangents to the lowermost portions of the concave curves is taken as a center line O1, the concave curves on one side of the center line O1 extend longer than those on the other side.

When a line perpendicular to tangents to the lowermost portions of the concave curves is taken as a center line O1, the concave curves are circular curves extending on one side with respect to the center line O1.

In this case, the side of the concave curves extending longer from the center line O1 may be preferably directed downward with respect to a line of sight during usage.

When the reflecting surface having a shape such that the concave curves in cross section extend one side with respect to the center line O1 is used with the concave curves extending one side directed downward, light from diagonally above can be effectively reflected to the front of the reflecting surface, so that the luminance of the reflected light can be increased in a direction of a user's line of sight.

In addition, if the reflector of the present invention is such that the concave surfaces being concave curves in cross section are formed in the shape of stripes in a direction intersecting the cross section, grooves traversing the stripes may be preferably formed at intervals in the concave surfaces extending in the shape of stripes. Further, the cross sections of the grooves may be preferably formed in a shape similar to that of the concave curves.

In a case in which the concave surfaces being concave curves in cross section extend in the shape of stripes, if the grooves traversing the stripes, i.e., the grooves along the concave curves are formed at intervals, all the directions of reflection of light can be concentrated onto the front of the reflecting surface. In this case, by optically designing the grooves to have a shape similar to that of the concave curves, the direction of reflection of light can be concentrated onto the front of the reflecting surface. In addition, since the provision of the grooves with equal pitches tends to cause the light interference fringe phenomenon, the grooves may be preferably formed with different pitches, and when a plurality of grooves with different pitches are taken as one set, several sets of grooves may be preferably formed.

In addition, a cross section of a sheet surface has a shape such that concave curves are arranged, and a reflecting metal film can be formed on the sheet surface to form the reflecting surface. With such a construction, by the application of pressure to the sheet surface with roller surfaces, concavities having predetermined optical characteristics can be formed with high accuracy.

According to another aspect of the present invention, there is provided a display device wherein the reflector is provided on the outer surface on the side opposite to the side of a display surface of a display cell with the reflecting surface directed to the display cell, or wherein the reflector is provided in a display cell with the reflecting surface directed to the side of the display surface.

Examples of the display cell include a liquid crystal display cell and so forth.

In general, since a gap between panels of the display cell, such as a liquid crystal display cell, is about 5 $\mu$m to 7 $\mu$m, the height h between the boundary portion of adjacent concave curves and the bottom portion of the concave curve may be preferably 1 $\mu$m or less. That is, the height h may be preferably one fifth or less of the gap size of the display cell. If the height h exceeds one fifth of the gap size of the display cell, non-uniformity of the gap remarkably occurs in the cell, thereby causing color irregularity in the case of, for example, the liquid crystal display cell.

When angles formed between tangents to the concave curves and a display surface of the display cell are taken as θ, the maximum absolute value of the angles θ is taken as θn, and an effective viewing angle of the display cell with respect to a perpendicular line of the display surface is taken as θt, θn may preferably be substantially one half of θt.

By forming the concave surfaces of the reflecting surface in the shape as described above, the range in which the luminance of the reflected light increases can be set in relation to the effective viewing angle of the display cell, and the contrast ratio of the display cell can be increased.

According to a further aspect of the present invention, there is provided a method of manufacturing a reflector used in combination with a display cell. The method comprises the steps of: forming an original sheet by processing an optical surface having fine irregularities on the surface thereof; preparing a replica by forming a metal film on the optical surface of the original sheet, and by peeling off the metal film; forming the same irregularities as those of the optical surface of the original sheet on a base surface by transferring the surface shape of the replica onto the base; and forming a reflecting metal film on the irregular surfaces of the base.

The method further comprises the steps of: attaching and fixing the replica onto the surfaces of rollers; and transferring irregular surfaces onto the base surface by rolling the replica on the base surface while heating the rollers to a predetermined temperature.

The method of manufacturing the reflector according to the present invention may preferably comprise the steps of: forming an optical surface having irregularities by processing fine grooves concentrically in an original sheet; forming concentric irregular surfaces on a replica; and forming a reflecting surface by transferring concentric irregular surfaces onto a base surface.

According to the method of manufacturing the reflector of the present invention, irregular optical surfaces are formed on the surface of the original sheet, and they are transferred onto the base by means of the replica, so that the reflecting surface of the base can be formed to have a predetermined reflective directivity with high accuracy.

The cross sections of the irregular surfaces processed in the original sheet and the reflecting surface transferred onto the base surface may preferably have a shape such that fine concave surfaces are arranged.

By optically designing the shape of the fine concave curves as described above, the luminance of reflected light can be increased within a predetermined angle range around a perpendicular line of the reflecting surface.

In addition, when a successive predetermined number of concave curves are taken as one set, different pitches of concave curves may be preferably included in one set, and several units of concave curves may preferably be repeatedly formed, one set of the concave curves being one unit. In this case, the width of one set of concave curves may be preferably 120 $\mu$m or more.

Thus, by changing the pitch of the concave curve regularly or at random within the range of 120 $\mu$m or more, for example, and by repeatedly forming several sets of concave curves, the concave curves having the above width being one set, the light interference fringe phenomenon which presents fringe patterns or rainbow patterns due to the influence of the reflected light can be prevented.

In addition, if the grooves forming the irregular surfaces are concentrically formed, not only a directivity of the reflected light within the range in which the luminance of the reflected light increases can be optically set in a direction along the cross section perpendicular to the stripes (the X direction of FIGS. 6A and 6B), but also a distribution of the luminance in a direction perpendicular to the cross section (the Y direction) can be set within a predetermined angle range around a perpendicular line of the reflecting surface, so that the range in which the luminance of the reflected light increases can be expanded.

Further, in the display device of the present invention, the reflector manufactured by the method of the present invention is provided on the outer surface on the side opposite to the side of the display surface with the reflecting surface directed to the side of the display cell, or the reflector is provided in the display cell with the reflecting surface directed to the side of the display surface.

BRIEF DESCRIPTION OF THE DRAWINGS

FIGS. 6A and 6B are plan views of the reflector;

FIG. 11 is a perspective view showing a still further embodiment of the present invention.

DESCRIPTION OF THE PREFERRED EMBODIMENT

Figure 5A:
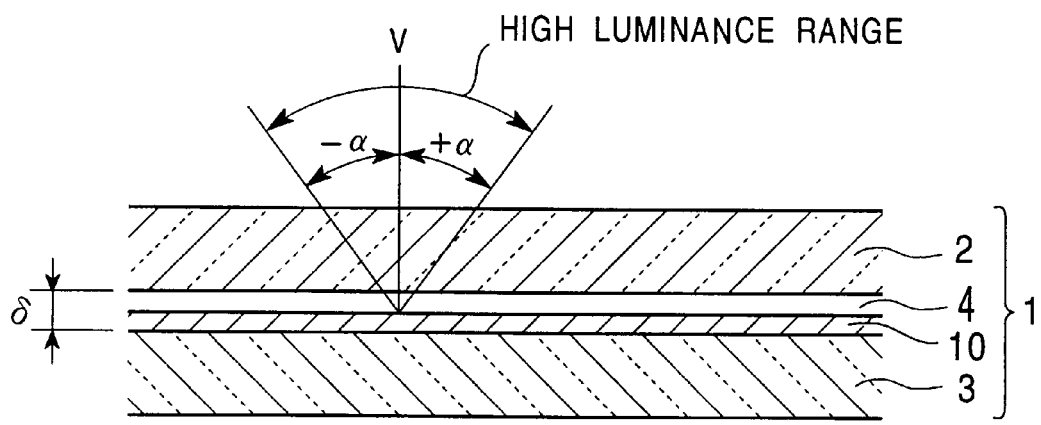
FIGS. 5A and 5B are enlarged sectional views each showing the mounting relationship between a display cell and a reflector.
Figure 5B:
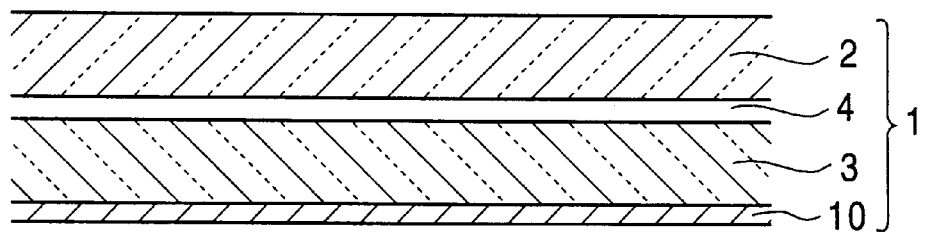

FIGS. 5A and 5B are partially enlarged sectional view of a display device according to an embodiment of the present invention.

In the display device shown in FIG. 5A, a reflector of the present invention is provided inside a liquid crystal display cell 1. In the display device shown in FIG. 5B, the reflector of the present invention is provided behind the liquid crystal cell 1.

In the liquid crystal display cell 1 shown in FIG. 5A, a liquid crystal material is sealed in a gap between transparent glass substrates 2 and 3, and a sheet-like reflector 10 is bonded and fixed onto the lower glass substrate 3 in the gap 4. In addition, an upper electrode formed of a transparent material (not shown), such as ITO or the like, is formed on the lower surface of the upper glass substrate 2. On the lower glass substrate 3, a transparent intermediate film (not shown), such as a silicon film, is formed on the surface of the reflector 10, and a lower electrode formed of the above ITO or the like is formed on the surface of the intermediate film.

Referring to FIG. 5B, the sheet-like reflector 10 is mounted behind the lower glass substrate 3 by means of bonding, or the like. A liquid crystal material is sealed in the gap 4, and transparent electrodes formed of ITO or the like are formed on the inner surfaces of the glass substrates 2 and 3 in the form of a matrix.

In both of the display devices shown in FIGS. 5A and 5B, the reflecting surface of the reflector 10 is directed toward a displaying surface, i.e., the upper glass substrate 2.

In these reflective display devices, natural light from above in the drawing passes through the glass substrate 2 or the glass substrate 3 to be totally reflected by the reflector 10, so that a contrast display corresponding to the bright state of the liquid crystal material can be observed by viewing the reflected light.

The reflector 10 may be a semi-transmissive reflector, and a backlight may be additionally provided behind the liquid crystal display cell 1. In this case, if the backlight is not lit up, luminance of the display contents is achieved by the reflected light from the reflector 10, and display luminance can be obtained by the light from the backlight at night and so forth.

In addition, the reflector of the present invention may be used as a reflecting surface of the backlight provided behind the liquid crystal display cell 1.

FIGS. 6A and 6B are plan views of the reflector 10.

The reflector 10 has a reflecting surface formed by depositing a reflecting metal film, such as aluminum, on the surface of a sheet (base film) having a thickness of 10 $\mu$m or more, and preferably, from 10 $\mu$m to no more than 100 $\mu$m. When the reflector 10 is of a total-reflective type, the sheet (base film) is formed of hard vinyl chloride, or the like. When the reflector 10 is of a semi-transmissive type, the reflecting metal film has a thickness of about 500 Å.

Fine concave surfaces G are formed adjacent to each other on the reflecting surface of the sheet. In FIG. 6A, striped concave surfaces G extend in parallel to each other in the Y direction. In FIG. 6B, the striped concave surfaces G are bent concentrically.

Figure 1:
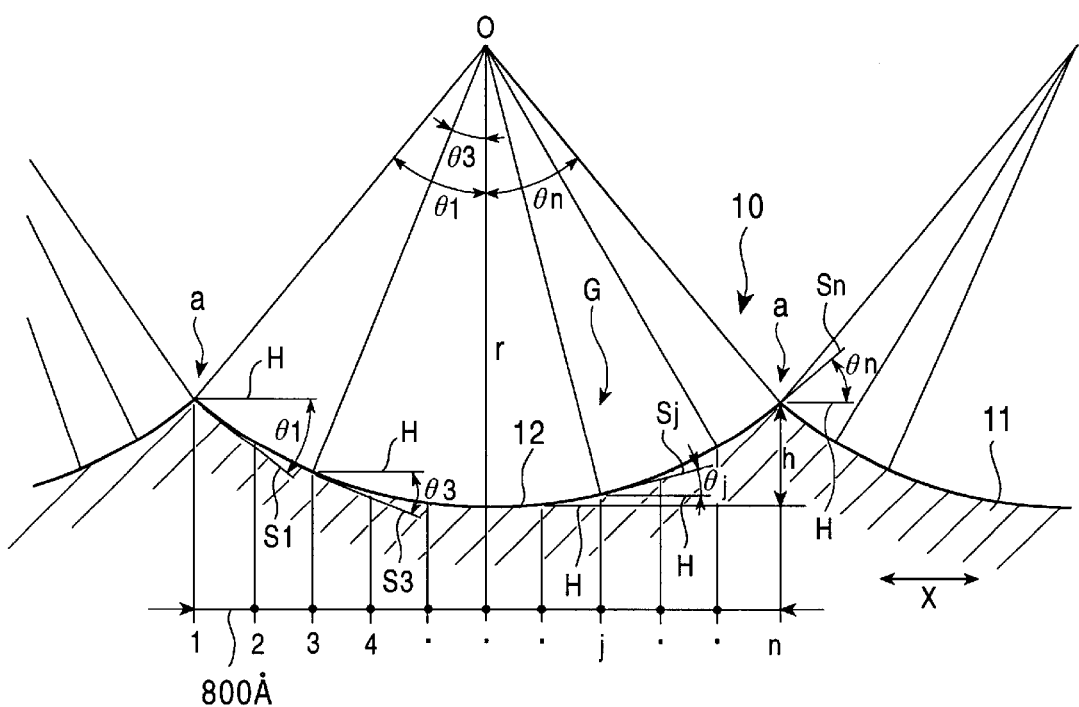
FIG. 1 is an enlarged sectional view showing a cross-sectional configuration of reflecting surfaces in a reflector according to the present invention.
Figure 3:
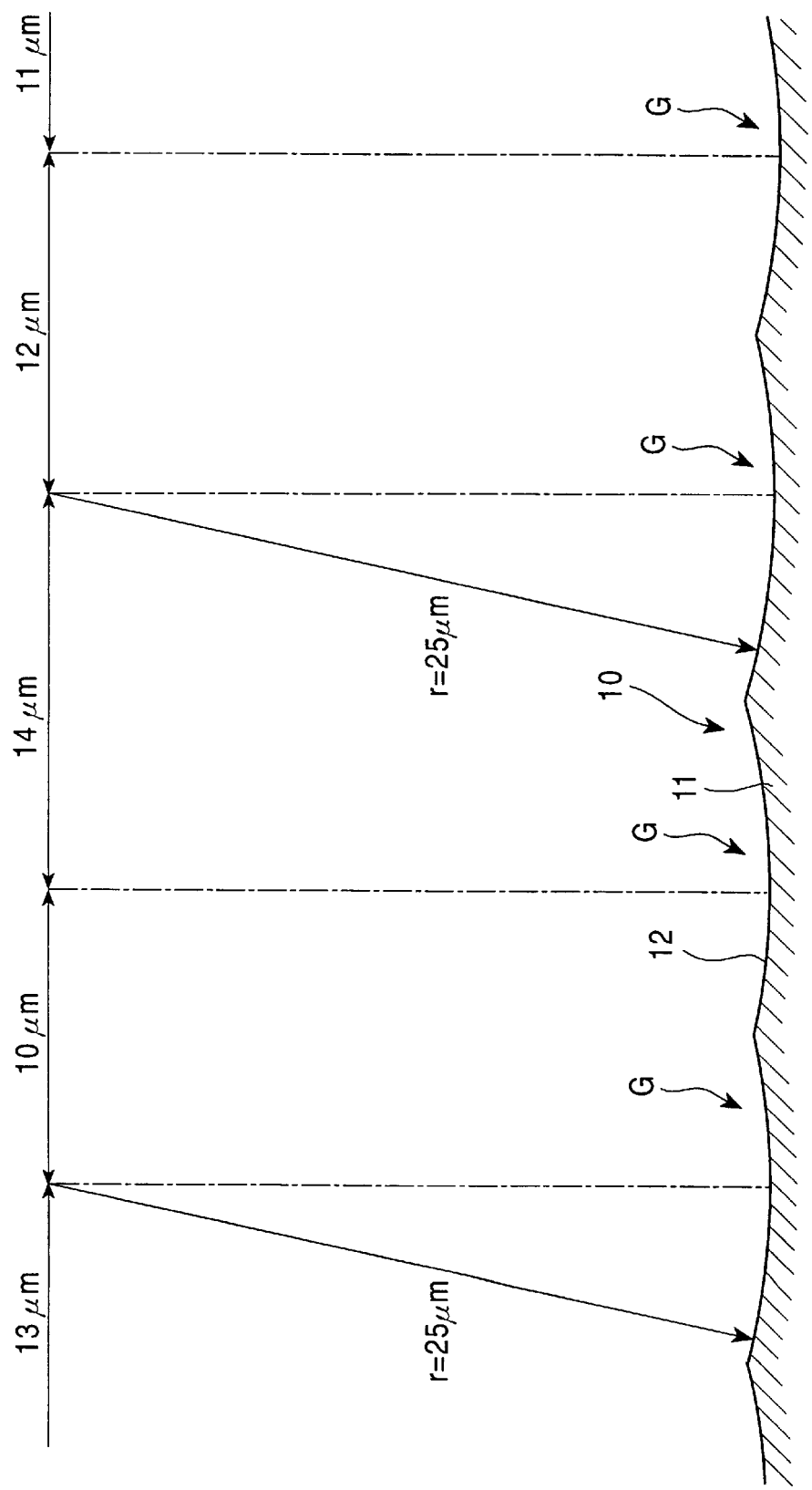
FIG. 3 is an enlarged cross sectional view of a reflecting surface having different pitches of concave surfaces.

FIG. 3 illustrates an enlarged cross section of the reflector 10 (taken along the line III—III of FIGS. 6A and 6B) extending in a direction perpendicular to the striped concave surfaces G, and FIG. 1 is an enlarged sectional view of part of FIG. 3.

As shown in FIGS. 1 and 3, the surface of the sheet 11 of the reflector 10 is a reflecting surface 12. The reflecting surface 12 has adjacent concave surfaces G formed thereon. The reflecting surface 12 at the part of the concave surface G is a concave curve in cross section, and more particularly, a circular curve having a predetermined radius r (for example, r=25 $\mu$m).

As shown in FIG. 1, a concave curve of one concave surface G viewed in cross section is divided into segments 1, 2, 3, ... j, ... n each of length 800 Å in the direction of a display surface (the X direction), and tangents perpendicular to the radiuses (normal lines) each extending from the centers of curvature O of the circular curves to boundary points of the segments are taken as S1, S2, ..., Sj, ... Sn. In addition, the absolute values of angles (tilt angles) formed between the tangents S1, S2, ..., Sj, ... Sn and the horizontal lines H are taken as $\theta 1, \theta 2, \theta 3, \ldots \theta j, \ldots \theta n$. Further, when the tangents S are rotated clockwise with respect to the horizontal lines H, the tilt angles are taken as "negative" angles, and the tilt angles are taken as "positive" angles when the tangents S are rotated counterclockwise with respect to the horizontal lines H.

Figure 2:
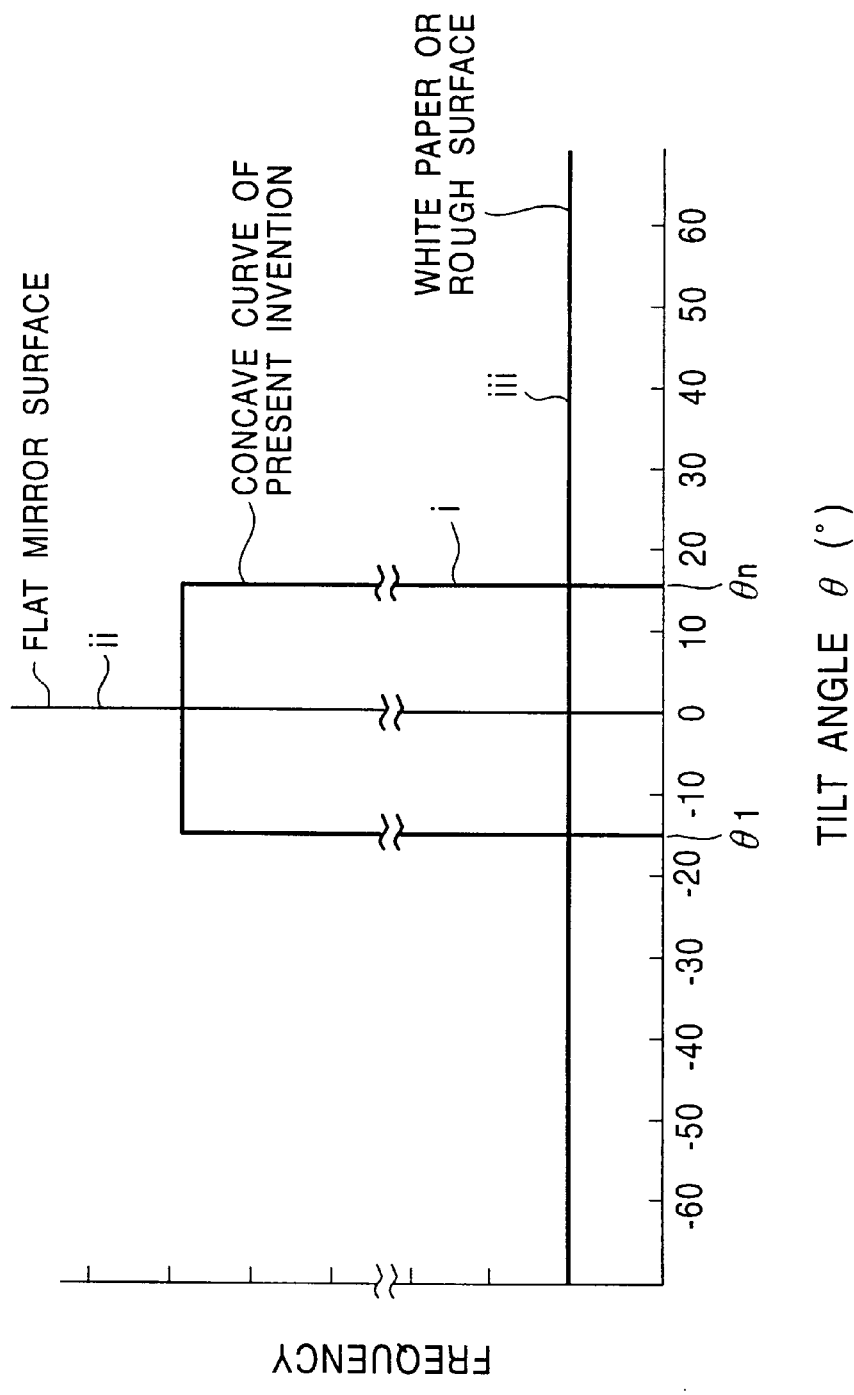
FIG. 2 is a diagram showing the relationship between frequency of tilt angles of tangents to the reflecting surfaces shown in FIG. 1 and frequency of angles of the tangents at a flat mirror surface and at white paper.

In FIG. 2, the horizontal axis represents the tilt angles $\theta$ formed between the tangents S1, S2, ..., Sj, ... Sn at portions of the concave curve divided into segments each of length 800 Å and the horizontal lines H. The vertical axis represents frequency of numerical values of the tilt angles $\theta$. In a case where the concave surface G is a circular curve in cross section, the frequency of the numerical value of each of the tilt angles $\theta$ at each point where the concave curve G is equally divided into segments in the X direction is "1" for one concave surface. The tilt angle θ is in the range of θ1 to θn, the boundary on the negative side is θ1, and the boundary on the positive side is θn. Therefore, on the reflecting surface 12 having adjacent concave surfaces G formed thereon, the tilt angle θ is in the range of θ1 to θn, and the frequency of the numerical value of each of the tilt angles is proportional to the number of the concave surfaces G. In FIG. 2, a graph i representing the frequency is formed in the shape of a vertical column.

On the other hand, when the reflecting surface is a flat mirror surface extending in the X direction, all the angles formed between the tangent to the reflecting surface and the horizontal line H are 0 degree only. In FIG. 2, the frequency of the angle formed by the tangent at the mirror surface is shown by a graph ii. In addition, when the reflecting surface is a plane white paper extending in the X direction, or a rough surface, the tilt angle formed between the tangents to the irregularities and the horizontal lines H appear in a substantially uniform frequency within the range of 0 degree to ±90 degrees. In FIG. 2, a graph iii represents the frequency of the tilt angles at the white paper or the rough surface.

When an angle range in which luminance of reflected light increases is taken as ±α with respect to perpendicular line V of the reflecting surface of the reflector 10, as shown in FIG. 5A, on the assumption that parallel light is incident on the reflecting surface (the horizontal line H) from a vertical direction, and the light is reflected from the reflecting surface, the angle range ±α is substantially twice the range of the tilt angle of the tangent to the concave curve. Therefore, in the case of the reflecting surface 12 of the present invention shown by the graph i in FIG. 2, the angle range ±α in which the luminance increases is twice the range of the tilt angles θ1 to θn, i.e., ±2×θ1 or ±2×θn. For example, if θ1 is −15 degrees, and θn is +15 degrees, the angle range ±α in which the luminance of the reflected light increases is substantially ±30 degrees.

Thus, by setting the tilt angles θ1 to θn in accordance with an effective viewing angle of the liquid crystal display cell 1, the luminance of the reflected light within the range of the effective viewing angle of the liquid crystal cell 1 can be increased, so that the display contrast can be increased. That is, if the maximum absolute value of the tilt angles of the tangents S1, S2, . . . is taken as θn and the tilt angle with respect to the perpendicular line V of the effective viewing angle of the liquid crystal display cell 1 is taken as θt, θn may preferably be set substantially to one half of θt.

On the other hand, when the reflecting surface is a flat mirror surface extending along the horizontal line, as shown by the graph ii in FIG. 2, an image is formed on the reflecting surface, so that the reflecting surface is undesirable as the reflector of the display cell. In addition, when the reflecting surface is white paper or a rough surface, the frequency range of the tilt angle of the reflecting surface is wide and the frequency of the respective angles is low, so that the luminance of the reflected light within the range of the effective viewing angle of the display cell cannot be increased.

The concave curve is geometrically drawn in FIG. 1, so that the boundary point a of the adjacent concave surfaces G is formed in the shape of an acute-angled edge. The boundary point a can be formed in the shape of a curve having a small curvature. If the boundary point a is directed upward in the drawing to form a convex curve, the frequency of the tilt angle of the tangent to the reflecting surface slightly changes from that of the graph i of FIG. 2, so that the frequency with which the tilt angle is 0 degree or the angles near 0 degree becomes high. However, the luminance-increasing property of the convex curve viewed as the overall reflecting surface is substantially equal to the concave curve shown in FIG. 1.

Alternatively, the boundary point a may be formed in the shape of a curve having a large curvature, and the cross-sectional configuration of the reflecting surface shown in FIG. 1 may be formed in the shape of a wave curve (sine curve). In this case, if the angles θ1 and θn are set within a fixed range in relation to the effective viewing angle of the liquid crystal display cell, the luminance of the reflected light can be increased within the range of the effective viewing angle of the liquid crystal display cell.

Here, the pitch of the concave curves shown in FIG. 1 may be preferably 50 μm or less, and more preferably be 10 to 14 μm. If the pitch becomes too large, the reflecting surface serves equally as a concave mirror, so that a displayed image causes distortion.

In addition, if the concave curves are adjacent to each other with the pitch of 50 μm or less, for example, fringe patterns or rainbow patterns appear due to interference of reflected light from the respective concave surfaces.

In order to prevent the occurrence of such a light interference fringe phenomenon, it is preferable to take a measure so that the pitches of the concave curves are not equal to each other within a fixed range. FIG. 3 illustrates the reflecting surface 12 for which the above measure is taken. Referring to FIG. 3, the pitch between the adjacent concave curves changes at random or changes regularly in turn such as 10 μm, 11 μm, 12 μm, 13 μm, and 14 μm. In addition, when a plurality of concave curves with different pitches are taken as one set, the concave curves are successively arranged taking one set as one unit. The width of a set of concave curves with different pitches (or the distance between the centers of curvature O located at both ends of a set of concave curves) may be preferably 120 μm or more, and more preferably, 140 μm or more. In this case, several sets of concave curves, each set having a width of 120 μm or more, are regularly repeatedly arranged. By setting the width of a set of concave curves to 120 μm or more, the light interference fringe phenomenon can be prevented.

In one set of concave curves having a width of 120 μm or more, all the pitches between the concave curves may be preferably different from each other. By arranging, for example, five pitches of 10 μm, 11 μm, 12 μm, 13 μm, and 14 μm at random, the light interference fringes of light can be sufficiently prevented. In addition, in order to prevent the occurrence of the light interference fringe phenomenon, at least two different pitches should be included in one set of concave curves.

In addition, since the concave curves are adjacently formed on the reflector 10, the surface of the reflector 10 has irregularities, and the height h of the irregularities is from the bottom to the boundary point a of the concave curve. In a case where the reflector 10 is provided within the gap 4 of the liquid crystal display cell 1, as shown in FIG. 5A, if the height h of the irregularities is too high, non-uniformity of the gap of the liquid crystal cell 1 may occur. In order to prevent deterioration of the quality of the displayed image due to the non-uniformity of the gap, the height h may be preferably one fifth of the gap size δ. In a common liquid crystal display cell, the gap size δ is in the range of 5 μm to 7 μm, so that the height h may be preferably 1 μm or less.

Figure 4:
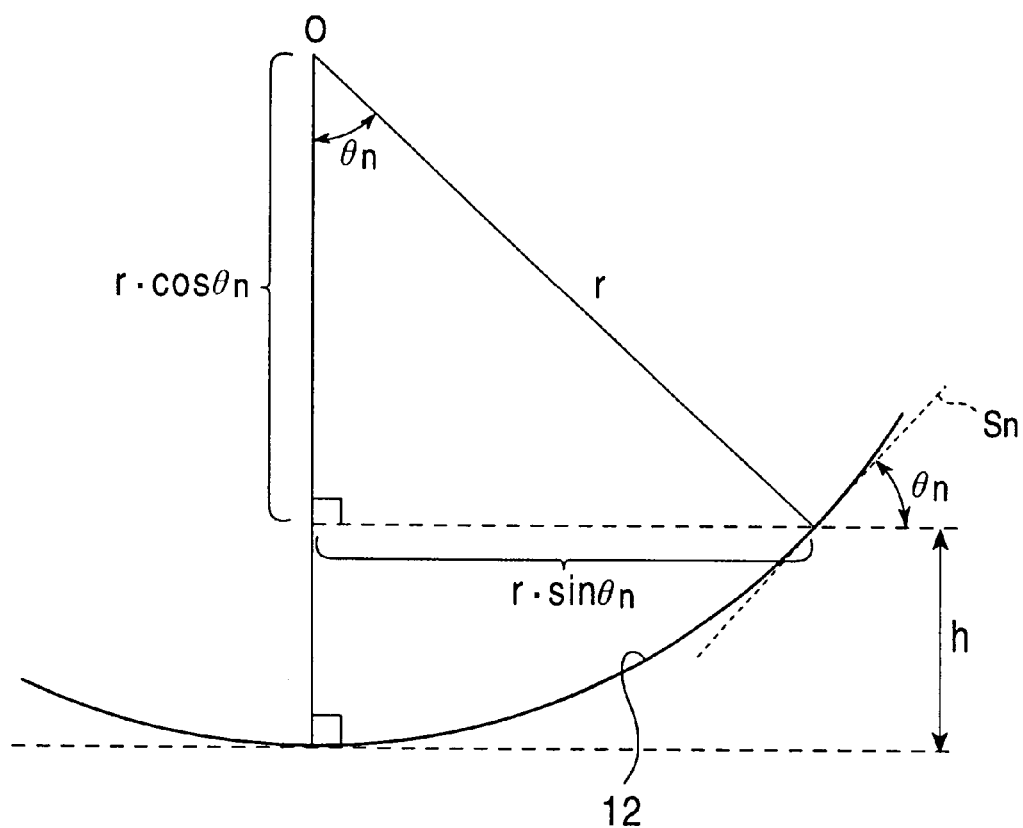
FIG. 4 illustrates the relationship among a radius of curvature of a concave curve, an angle of a tangent to the concave curve, and a height of irregularities.

FIG. 4 illustrates the relationship between the height h and the maximum value of the tilt angle θn of the tangent to the concave curve.

As shown in FIG. 4, the height h=r (1−cos θn). Here, if the condition h≦1 μm is satisfied, θn is 16.3 degrees or less when r=25 μm. In addition, the pitch P of the concave curves is represented by the expression P=2r·sin θn. If r=25 μm, and θn=16.3 degrees, the maximum value of the pitch P is 14 μm. Thus, in order to obtain a height h of the irregularities of 1 μm or less when r=25 μm, the pitch P may be set to 14 μm or less.

As described above, since the range of the tilt angles θ1, θ2, ... of the tangents S1, S2, ... to the concave curves are restricted when the reflecting surface 12 is viewed in cross section perpendicular to the concave surfaces G, the angle range in which the luminance of the reflected light increases can be set within the range of the effective viewing angle of the liquid crystal cell. When the striped concave surfaces G are extending parallel to each other in the Y direction, as shown in FIG. 6A, the reflected light can be allowed to have a directivity with respect to the X direction within the angle range in which the luminance of the reflected light increases. In the Y direction, however, this effect cannot be exhibited.

On the other hand, when the striped concave surfaces G are arranged concentrically, as shown in FIG. 6B, the reflected light can be allowed to have a directivity also with respect to the Y direction within the angle range in which the luminance of the reflected light increases. Therefore, the concave surfaces G may be preferably formed as shown in FIG. 6B. In addition, the concave surfaces G may continue in the form of wave in the Y direction when viewed in plan view as shown in FIGS. 6A and 6B. Further, by forming a three-dimensional concavity, such as a spherical concavity, having concave curves in cross section as shown in FIG. 1 or 3, the reflected light can be allowed to have a directivity with respect to both of the X and Y directions within the angle range in which the luminance of the reflected light increases.

A method of manufacturing the reflector 10, especially the reflector 10 shown in FIG. 6B, will now be described with reference to the flow chart of FIG. 7.

In an original sheet preparation step a, a surface of a metal disc (original sheet) 20 is precision-lathed to form concentrically striped concave surfaces Ga. The concave surfaces Ga are processed in such a manner that several units of concave curves are successively arranged, a predetermined number of concave curves having different pitches being one unit, as shown in FIG. 3. For example, the original sheet 20 is fixed to a shaft of a precision lathe and rotated, and concentric concave surfaces Ga are cut using a cutting tool whose tip is formed by a single crystal material or the like. The feeding speed of the cutting tool is controlled to vary the pitches of the concave surfaces Ga at random, and the original sheet 20 is processed in such a manner that several sets of the concave surfaces Ga are repeatedly arranged, a predetermined number of concave surfaces having different pitches being one set. A predetermined rectangular area 20a of the original sheet 20 is used to manufacture the reflector 10.

In a replica preparation step b, a female form of the area 20a is prepared. In this step, a hard metal film, such as a hard nickel film, is formed on the entire surface of the original sheet 20 or on the rectangular area 20a by electroforming, and the film is peeled off to form a replica.

In step c, the replica is attached and fixed onto the surfaces of presser rollers.

In an embossing step d, a hard vinyl chloride sheet is provided as a sheet (base film) on the surface of a PET (polyethylene terephthalate) film or the like, and the sheet is fed by being sandwiched between the rollers. By heating the rollers and setting the temperature of the replica to a predetermined temperature (temperature near glass transition point Tg of the hard vinyl chloride), the concave surfaces shown in FIG. 3 can be transferred onto the surface of the sheet.

In a reflecting film deposition step e, a reflecting metal film, such as aluminum, is deposited on the surface of the sheet (base film) on which irregularities are transferred to form the reflecting surface 12.

Then, portions of the base film except the necessary area are eliminated to complete a reflecting sheet (reflector 10).

According to the manufacturing method, by accurately forming the concave surfaces Ga on the original sheet 20, the reflecting surface having predetermined optical characteristics shown in FIGS. 1 and 3 can be manufactured in large quantity with high accuracy.

Other embodiments of the reflector according to the present invention will now be described with reference to FIGS. 8 to 11.

Figure 8:
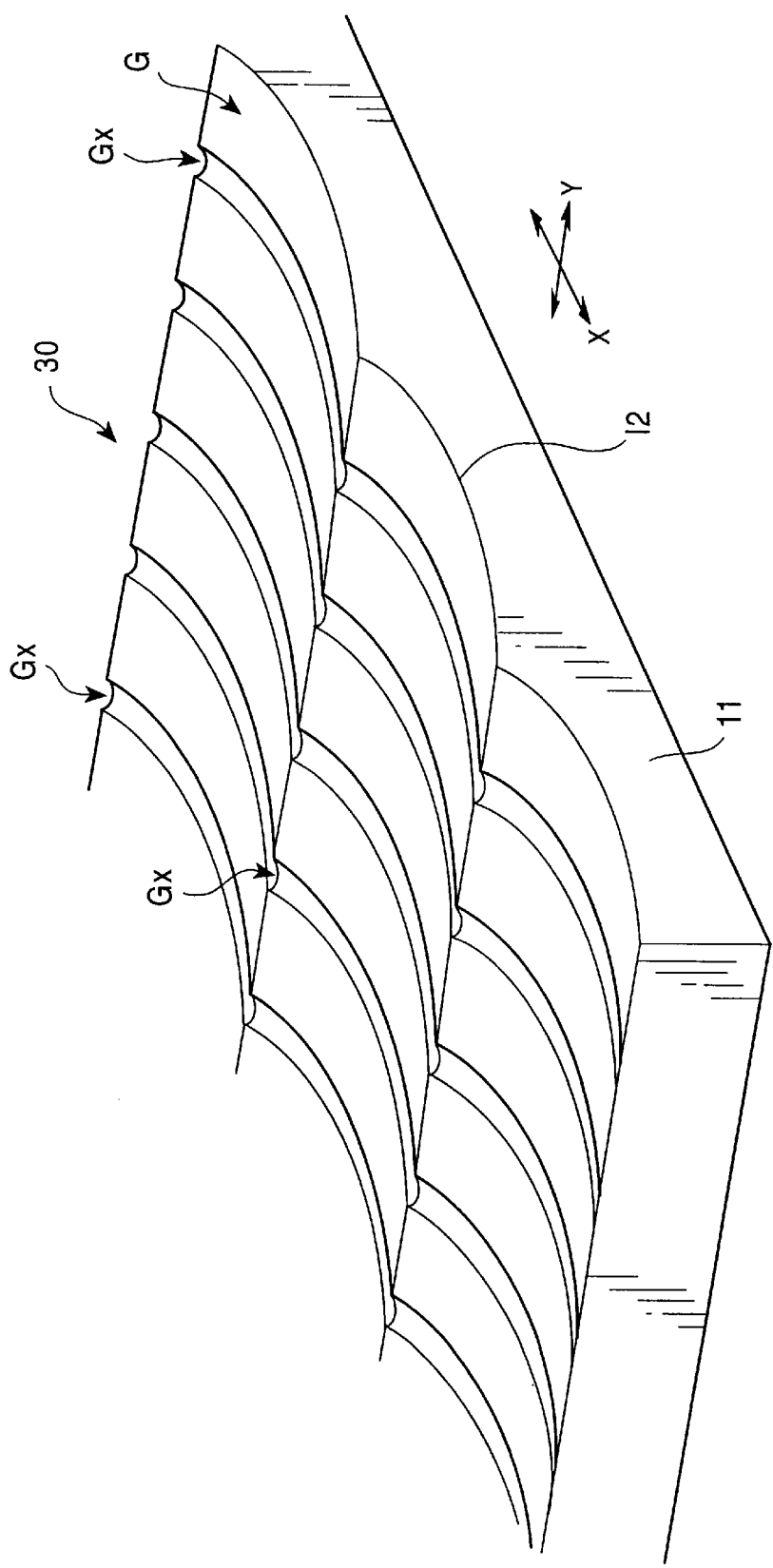
FIG. 8 is a perspective view showing another embodiment of the reflector according to the present invention.

In a reflector 30 shown in FIG. 8, grooves Gx are formed in the X direction in the concave surfaces G of the reflector 10 shown in FIGS. 1 to 6. A number of grooves Gx extend along the concave surfaces G, and are formed at intervals in the direction in which the concave surfaces G extend in the shape of stripes (Y direction).

The cross section of the groove Gx is formed in a shape similar to that of the concave surface G formed on the reflector 10. That is, as shown in FIG. 1, the groove Gx is a circular curve in cross section. In addition, if the maximum absolute value of the angles formed between the tangents to the circular curves and the horizontal surfaces is taken as θn and the angle with respect to the perpendicular line V of the effective viewing angle of the liquid crystal cell is taken as θt, θn may be preferably set to substantially one half of θt.

The pitch of the grooves Gx (the distance between the centers of the adjacent grooves) may be preferably 50 μm or less and is set at random, similar to the case shown in FIG. 3. In addition, it is preferable that several sets of the grooves Gx are repeatedly arranged when a predetermined number of grooves Gx having different pitches are taken as one set.

The thus obtained reflector 30 can increase the luminance of the reflected light within the range of the effective viewing angle with respect to both the X and Y directions, allow the reflected light to have directivity over the full range, increase the luminance of the reflected light within the range of the effective viewing angle of the display device, and increase display contrast. In addition, by arranging the pitches of the grooves Gx at random, the occurrence of interference fringes due to the provision of the grooves Gx can be prevented.

According to the display device using the reflector of the present invention, light (natural light, light of a fluorescent lamp, and so forth) usually enters the display surface not from the direction of the perpendicular line V but from diagonally above. In addition, the viewing direction of a user is substantially the same as the direction of the perpendicular line V.

Figure 9:
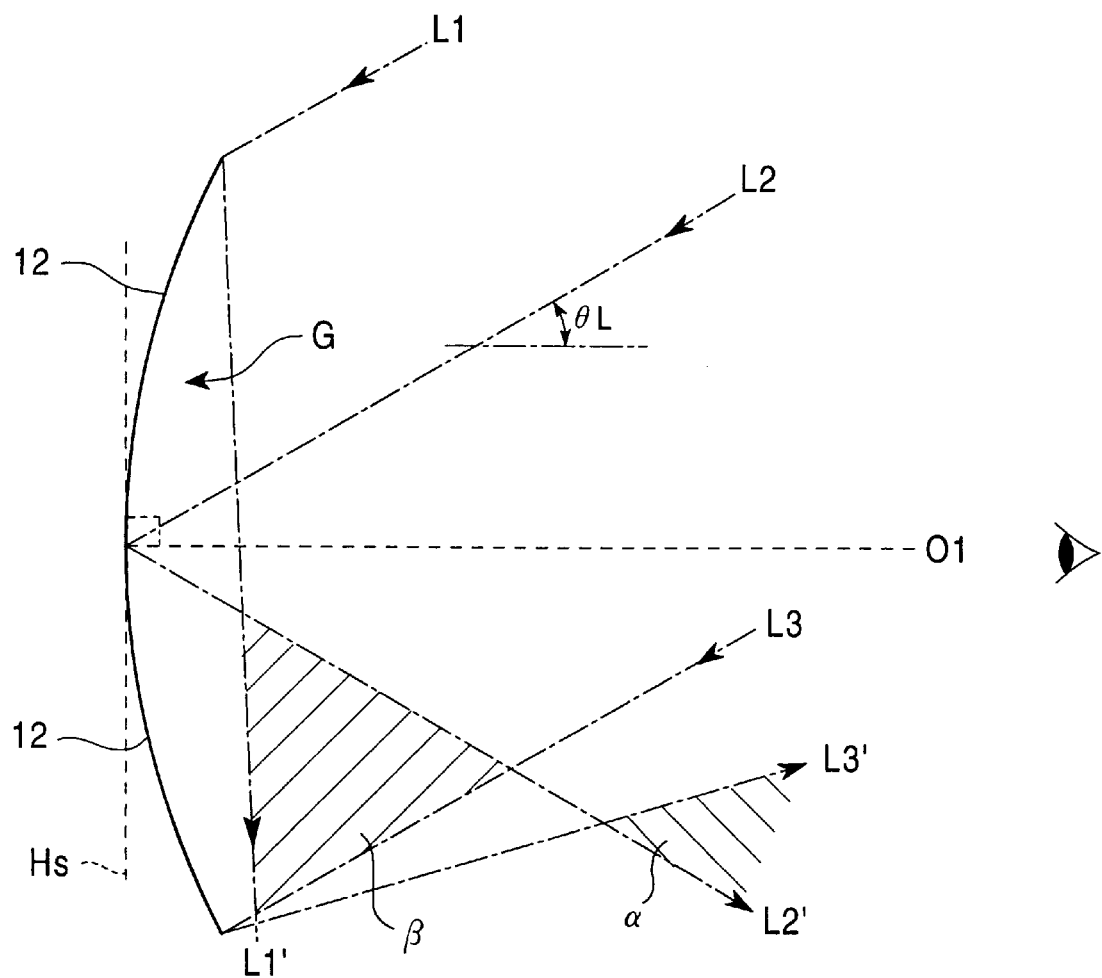
FIG. 9 illustrates the relationship between incident light and reflected light at a concave surface of the reflector according to the present invention.

FIG. 9 illustrates a case in which the reflectors 10 and 30 are vertically placed and viewed from the front thereof. In the reflector 10 shown in FIGS. 1, 6A and 6B and the reflector 30 shown in FIG. 8, the concave curve of the concave surface G is a circular curve in cross section. As shown in FIG. 9, if a tangent to a lowermost portion of the concave curve is taken as Hs, the angle formed between the tangent Hs and the horizontal line H is 0 degree. If a perpendicular line with respect to the tangent Hs is taken as a center line O1, the concave curve extends by the same length in directions symmetrical about the center line O1 in the reflector 10 and the reflector 30.

Assume that the viewing direction of the user is parallel to the center line O1, and parallel light enters the reflecting surface 12 at an angle θL (for example, 30 degrees) from above with respect to the center line O1, as shown in FIG. 9.

In this case, in the upper half of the concave curve from the center line O1, the parallel light from diagonally above becomes the incident light in the range of L1 to L2, and the reflected light of the incident light is in the range of L1' to L2'. The reflected light L1' to L2' illuminates in the direction of an area β, and is directed downward from the user's line of sight. In contrast, in the lower half from the center line O1, the incident light is in the range of L2 to L3, and the reflected light thereof is in the range of L2' to L3'. The reflected light L2' to L3' illuminates in the direction of an area α, and is directed toward the user's line of sight.

The reflected light can be guided within the effective viewing angle, and the luminance can be increased in the illumination area α as compared with the illumination area β. The illumination area β does not substantially contribute to an increase of the luminance of the reflected light in the effective viewing angle.

Thus, a reflector having the concave curve which forms the concave surface G having the lower part from the center line O1 longer than the upper part is more suitable for the reflector for use in a liquid crystal display device and so forth in which improvements in reflecting the light from diagonally above are required, rather than a reflector having the concave curve which is vertically symmetrical with respect to the center line O1 and extends by the same length in both directions. Further, if the reflecting surface is formed such that the lower half of the concave surface G from the center line O1 is formed into substantially a successive saw-toothed shape, a reflector 40 capable of increasing the luminance of the reflected light within the effective viewing angle can be obtained.

Figure 10:
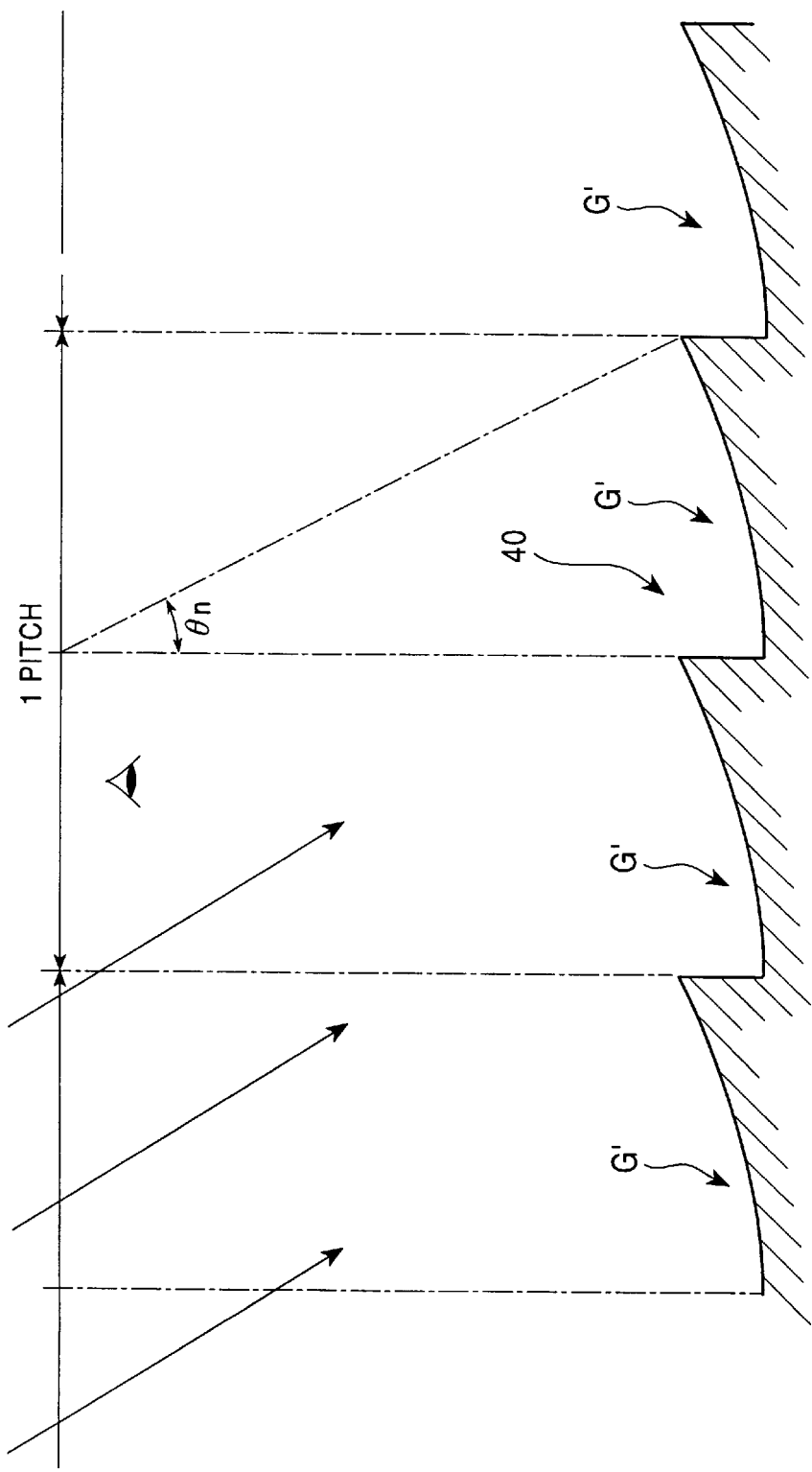
FIG. 10 is an enlarged sectional view showing a further embodiment of the reflector according to the present invention.

FIG. 10 illustrates an example of the reflector 40 in which the substantially saw-toothed concave surfaces G' each having a concave curve (semi-circular curve) in cross section are successively formed. In this case, the pitch between the concave surfaces is equivalent to the length of two adjacent concave surfaces G'. The pitch may be preferably 50 μm or less, and more preferably, about 10 μm to 14 μm for the same reasons described above.

In addition, in the reflector 40, it is preferable that when a predetermined number of successive concave curves are taken as one set, different pitches of the concave curves are included in one set, and several units of the concave curves are repeatedly formed, one set being one unit. In this case, the width of one set of concave curves may be preferably 120 μm or more. Thus, by changing the pitch of the concave curve regularly or at random in the range of the width of 120 μm, and by repeatedly forming several sets of concave curves, the concave surfaces having the above width being one set, the light interference fringe phenomenon which presents fringe patterns or rainbow patterns due to the interference of the reflected light can be prevented.

FIG. 11 illustrates a modification of the reflector 40. Grooves of a reflector 50 are formed in the same manner as that of the grooves Gx shown in FIG. 8. The reflector 50 includes grooves G'x each having a concave surface shape in cross section provided along the concave curves of the concave surfaces G'.

Figure 7:
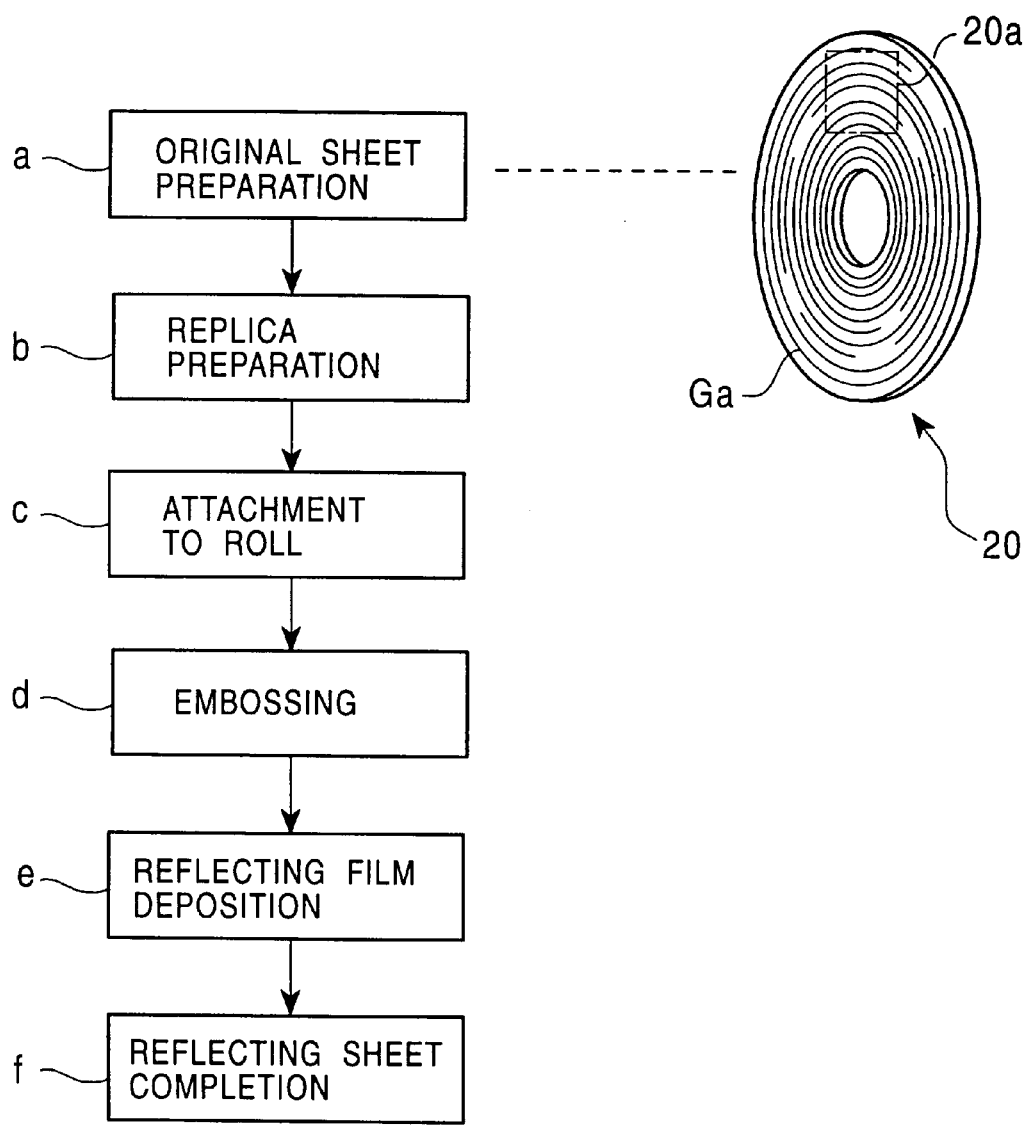
FIG. 7 is a flow chart showing the process of manufacturing the reflector.

The reflectors 30, 40, and 50 can be manufactured by the same manufacturing method as that shown in FIG. 7.

In the reflector 40 shown in FIG. 10, the concave surfaces may be formed into substantially the saw-toothed shape when manufacturing the original sheet 20. When manufacturing the reflector having grooves Gx or G'x shown in FIGS. 8 and 11, the grooves perpendicular to the striped concave surfaces Ga may be formed after the concave surfaces Ga have been formed on the original sheet 20 shown in FIG. 7.

In addition, the reflector of the present invention may be one in which the grooves Gx shown in FIG. 8 are formed in the reflector 10 shown in FIG. 6B having concentrically arranged reflecting surfaces. Further, the concave surfaces G' may have the cross-sectional configuration shown in FIG. 10.

As described above, according to the present invention, reflected light can be allowed to have a directivity within the angle range in which the luminance of the reflected light increases, so that the angle range in which the luminance of the reflected light increases can be set in accordance with the effective viewing angle range of a display device, such as a liquid crystal display device. In addition, a combination of pitches of concave surfaces can prevent the occurrence of a light interference fringe phenomenon.

Further, by transferring irregular surfaces to the sheet surface to deposit a metal reflecting film thereon, a thin reflecting sheet can be manufactured in large quantities.

Moreover, according to the display device of the present invention, the luminance of the reflected light can be increased within the effective viewing angle, so that the viewing angle contrast is increased.

What is claimed is:

1. A reflector for a liquid crystal display device having a total-reflective or a semi-reflective reflecting surface, wherein said reflecting surface comprises a plurality of fine circular-arc concave curves arranged side-by-side when viewed in cross section, and wherein:

the maximum tilt angle of each of said circular-arc concave curves is set substantially to one half of an effective viewing angle;

the pitch of said circular-arc concave curves is 50 μm or less;

the surface of the reflector has n irregularities;

the height $h_n$ of each of the irregularities is given by the formula $h_n = r(1 - \cos 2_n)$ and the pitch $P_n$ of each of the fine circular-arc curves is given by the formula $P_n = 2r(\sin 2_n)$, wherein $2_n$ is the tilt angle of a tangent to one of the fine circular-arc concave curves and r is the radius of the fine circular-arc concave curve of which $2_n$ is the tangent;

the tilt angle $\theta_n$ is in the range of a predetermined angle;

when a successive predetermined number of said circular-arc concave curves are taken as one set, different pitches of said circular-arc concave curves are included in said one set, and several units of said circular-arc concave curves are repeatedly formed, said one set of circular-arc concave curves being one unit; and transparent upper and lower substrates are held by a predetermined gap formed therebetween, a liquid crystal material is sealed in the gap, the reflector is provided on the lower substrate in the gap, and the height $h_n$ of the concave surface is one-fifth of the size of the gap.

2. A reflector for a liquid crustal display device as claimed in claim 1, wherein, when a line perpendicular to the tangent of the lowermost portion of each of said circular-arc concave curves is taken as a center line, said circular-arc concave curves extend symmetrically about the center line.

3. A reflector for a liquid crustal display device as claimed in claim 1, wherein, when a line perpendicular to the tangent of the lowermost portion of each of said circular-arc concave curves is taken as a center line, said circular-arc concave curves on one side of said center line extend longer than those on the other side.

4. A reflector for a liquid crustal display device as claimed in claim 3, wherein the side of said circular-arc concave curves extending longer from said center line is directed downward with respect to a direction of a line of sight during usage.

5. A reflector for a liquid crustal display device as claimed in claim 1, wherein, when a line perpendicular to the tangent of the lowermost portion of each of said circular-arc concave curves is taken as a center line, said circular-arc concave curves extend on one side with respect to said center line.

6. A reflector for a liquid crustal display device as claimed in claim 1, wherein the width of one set of said circular-arc concave curves is 120 $\mu$m or more.

7. A reflector for a liquid crustal display device as claimed in claim 1, wherein said circular-arc concave curves extend in the shape of stripes in a direction intersecting said cross section.

8. A reflector for a liquid crustal display device as claimed in claim 7, wherein grooves traversing said circular-arc concave curves extending in the shape of stripes are formed at intervals in said circular-arc concave curves extending in the shape of stripes.

9. A reflector for a liquid crustal display device as claimed in claim 8, wherein the cross sections of said grooves are formed in a shape similar to that of said circular-arc concave curves.

10. A reflector for a liquid crystal display device as claimed in claim 1, wherein said circular-arc concave curves extend in the shape of stripes in a direction intersecting said cross section, and said circular-arc concave curves extend in the shape of curves in the direction of said cross section.

11. a reflector for a liquid crustal display device as claimed in claim 1, wherein a cross section of a sheet surface has a shape such that said circular-arc concave curves are arranged, and a reflecting metal film is formed on the sheet surface to form said reflecting surface.

12. A display device, wherein the reflector for a liquid crustal display device as claimed in claim 1 is included.

* * * * *

UNITED STATES PATENT AND TRADEMARK OFFICE
CERTIFICATE OF CORRECTION

PATENT NO. : 6,199,992 B1
DATED : March 13, 2001
INVENTOR(S) : Tetsushi Tanada

It is certified that error appears in the above-identified patent and that said Letters Patent is hereby corrected as shown below:

Claim 2,
Line 1, change "crustal" to -- crystal --.

Claim 3,
Line 1, change "crustal" to -- crystal --.

Claim 4,
Line 1, change "crustal" to -- crystal --.

Claim 5,
Line 1, change "crustal" to -- crystal --.

Claim 6,
Line 1, change "crustal" to -- crystal --.

Claim 7,
Line 1, change "crustal" to -- crystal --.

Claim 8,
Line 1, change "crustal" to -- crystal --.

Claim 9,
Line 1, change "crustal" to -- crystal --.

Claim 10,
Line 1, change "crustal" to -- crystal --.

UNITED STATES PATENT AND TRADEMARK OFFICE
CERTIFICATE OF CORRECTION

PATENT NO. : 6,199,992 B1
DATED : March 13, 2001
INVENTOR(S) : Tetsushi Tanada

It is certified that error appears in the above-identified patent and that said Letters Patent is hereby corrected as shown below:

Claim 11,
Line 1, change "crustal" to -- crystal --.

Claim 12,
Line 1, change "crustal" to -- crystal --.

Signed and Sealed this

Fourth Day of December, 2001

Attest:

*Nicholas P. Godici*

Attesting Officer

NICHOLAS P. GODICI
*Acting Director of the United States Patent and Trademark Office*